Nov. 25, 1947.    A. E. SIEHRS    2,431,623
DRYING OF EXTRACT-SOLUTIONS
Filed Jan. 8, 1945
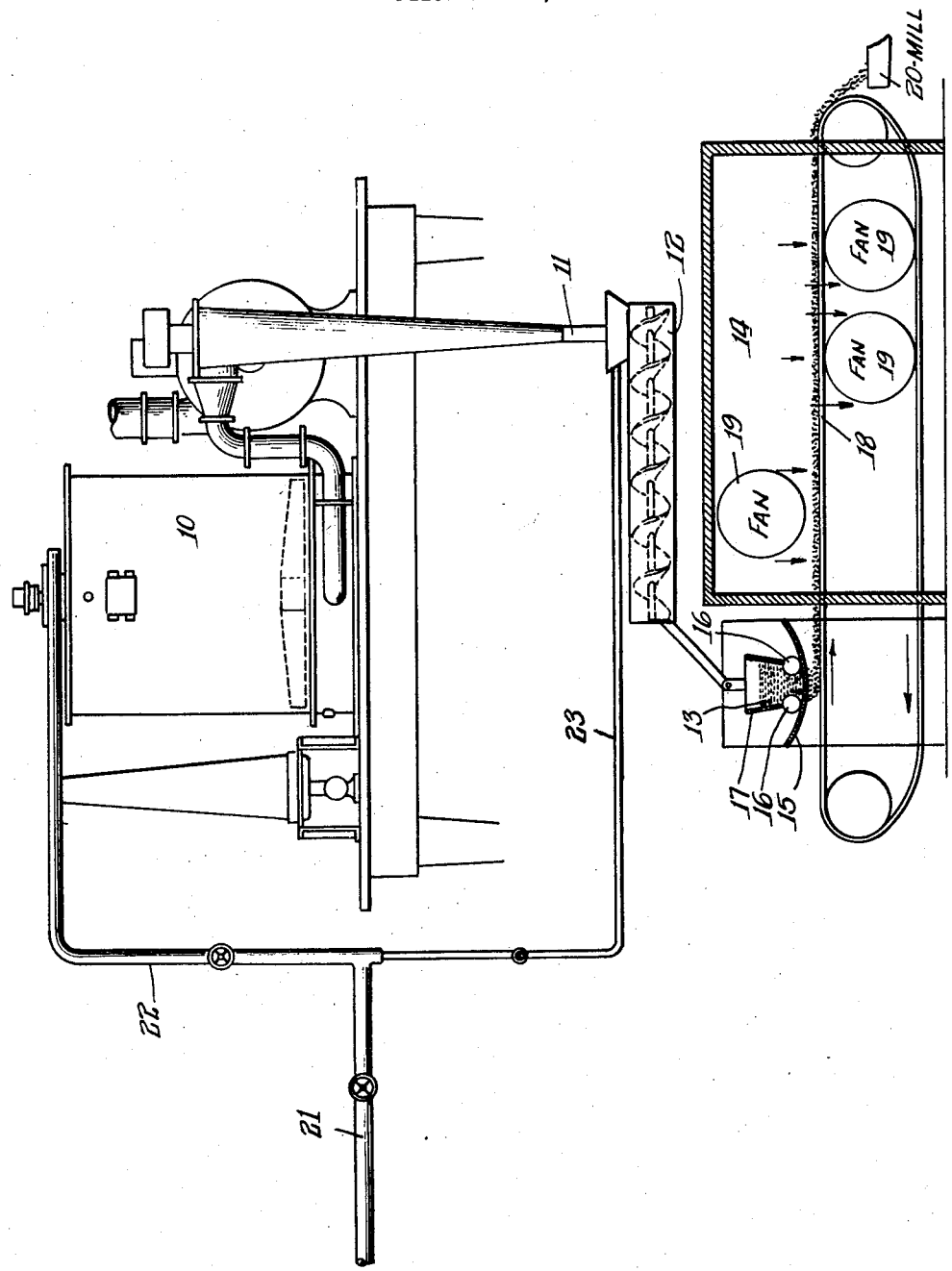
INVENTOR.
Arthur E. Siehrs
BY
Walter M. Fuller
Atty.

Patented Nov. 25, 1947

2,431,623

UNITED STATES PATENT OFFICE 2,431,623

DRYING OF EXTRACT SOLUTIONS

Arthur E. Siehrs, Chicago, Ill., assignor, by mesne assignments, to Krim-Ko Corporation, Chicago, Ill., a corporation of Illinois Application January 8, 1945, Serial No. 571,926

12 Claims. (Cl. 99—199)

The present invention relates to a new and improved method to take advantage of the use of a spray-drier in moisture reduction of Irish moss extract-solution and other comparable substances which cannot be dried solely satisfactorily in a spray-drier because of the impossibility of obtaining a product in so doing of such physical characteristics as to be acceptable commercially as a suitable spray-dried material, the term water-soluble, as employed herein, referring to those materials which provide true solutions in water or those which are dispersed in water and can be extracted by water.

In drying milk in a spray-drier it is first necessary to condense the milk to about 40% solids (a) to obtain a spray-product which is compact and heavy enough to pack in barrels or comparable containers without extensive loss or expensive cost of packaging by reason of the fluffiness of the material and also (b) to afford a powdery solid material which is dense enough so that excessive surface is not exposed to the air, thus avoiding deterioration of the product.

Were an attempt made to spray-dry milk having a solids-content of only 3% or 4%, the effect would be a material so fluffy and light that an ordinary-size barrel, which holds about one hundred pounds of dried-milk solids, would accommodate only about 10 to 15 pounds, and in addition the downy product would deteriorate rapidly due to the large percentage of surface exposure to the air.

It is feasible to dry milk commercially in a spray-drier due to the fact that it is possible to condense the milk preliminarily in an evaporator to about 40% solids without having an excessively thick or unduly viscous product at such concentration. Various substances, such as gum karaya, gum tragacanth, gelatin, Irish moss, other seaweed extracts of the type of agar-agar or sodium alginate, pectin, and numerous other materials cannot be obtained in water concentrations higher than from 1% to 10% which, due to the fact that their solutions in water are very thick and viscous, cannot be handled by ordinary plant equipment.

In the case of Irish moss extract-solution it is impossible to obtain concentration greater than 3¼% or 4% before the solution becomes so solid that it cannot be pumped or sprayed through the spray-drier nozzles, this property of the Irish moss extract-solution obviously limiting the solids content of the material to be sprayed. Concentrated Irish moss extract-solution can be sprayed and a dried product obtained from the sprayer, but since the solution has such a low limit of solids, the resulting dried material is extremely fluffy and has a very low apparent density, the lightness of the material presenting substantial packaging difficulties.

Moreover, since such spray-dried Irish moss extract is a very light powder, it has a large surface area exposed, and, when solution of such powder in water is attempted, the material has a substantial tendency to lump up into a ball and to resist solution unless extremely vigorous agitation is employed.

In addition, a further consequence of the large amount of exposed surface is that this material is quite hydroscopic and degenerates readily under the influence of atmospheric moisture and ordinary summer temperatures; but, if the Irish moss extract-solution is dried by other means, such as by atmospheric or vacuum roller driers, the resulting product has a much greater apparent density and mixes readily with water without the troublesome lumping of the spray-dried product. Moreover, the roller-dried product has greater stability in the presence of moisture and temperature than the spray-dried material.

It has heretofore been impossible, for these reasons, to spray-dry materials of this type satisfactorily and the present invention relates to an improved method by which it is practicable and feasible to use a spray-drier in the attainment of the desired result.

To enable those skilled in this art to understand the present invention, the advantages accruing therefrom, and the means employed at present for performing the innovatory method or procedure, the appliance used therefor has been illustrated in the single view of the accompanying drawing, forming a part of this specification, and to which reference should be had in connection with the following detailed description, this drawing presenting the parts of the appliance more or less diagrammatically.

Essentially, the current new invention consists in the employment of means, such as connected valve-controlled supply pipes 21, 22, by which the Irish moss water-extract to be dried is fed to the spray-drier 10 of known construction in which it is only partially dried, the product retaining a more or less substantial amount of its liquid.

Such partially dried material is delivered from the drier at 11 into a dough-mixer 12, of any ordinary or suitable construction, wherein it is mixed and formed into a dough mass of suitable consistency which is fed into the rolling extruder feed 13 of an aero-form drying system 14 wherein the dough-like material is pressed through the perforations of a plate 15 by rollers 16, 16 at the discharge end of an oscillatory hopper 17 whereby the dough extruded through such small apertures is fed onto an endless conveyor 18 on which it is subjected to warm or hot air fed through and over it by a plurality of fans 19, the resulting product at the discharge end of the belt being a body of dried, small size, individual extruded particles.

This product may then be ground in a hammer-mill, a small portion of which is shown at 20, or chopped to obtain the desired form, shape and size of the particles and such body of material has a much higher apparent density than a comparable spray-dried extract.

A completely spray-dried product would contain a certain amount of moisture, say in the neighborhood of 10% of the weight of the product, but in partially drying the extract-solution in the spray-drier the product will have about two to four parts of water by weight for each part of solids, which is sufficient to be able to convert the product into dough-like character by merely mixing it.

Or, if preferred for any reason, the partly-dried product issuing from the drier may have a lesser degree of moisture and the required addition thereto to provide the dough-consistency may be supplied to the mixer 12 through a supplemental, valve-equipped feed-pipe 23, such liquid being of any suitable type, but normally ordinary Irish moss extract-solution like that fed into the drier.

In addition, it is possible to regulate the density of the small dried particles by varying the degree of partial drying or by changing the amount of extract-solution remixed with the material delivered from the drier, and also by modifying the pressure used in the extrusion process.

Further, it is practicable to case-harden the pellets by varying the several factors involved to obtain a much higher resistance to atmospheric influences, so that the product is considerably more stable on storage during warm humid days than the fluffy spray-dried product is.

This novel procedure is applicable to many materials which formerly were produced only by chemical precipitation or freezing, as in the case of agar-agar and will allow the use of methods which will materially reduce their processing costs.

Whereas, above, the liquid added to the partially dry product to convert it into a dough-like material is indicated as a part of the original extract-solution, it need not necessarily be so in that water, or other suitable liquid, rather than the extract-solution, could be employed.

The extruded dried particles, case-hardened or not, may be sold and used as such, or they may be ground as referred to at any time subsequent to such drying.

Hereinabove reference has been made to various substances which cannot be obtained in water-concentrations greater than 1% to 10% by reason of the fact that their water-solutions are very thick and viscous, but other employable compounds may be substances whose limitations on solids are due to factors other than thickness of the liquid, such as very slight solubility or other reasons for not wishing to subject a concentrated solution to drying.

Furthermore, although subdivision of the dough-body into small particles by extrusion has been mentioned, it is to be borne in mind that this is not the only convenient way of preparing the dough for efficient drying, and that other procedures can be satisfactorily resorted to, such, for example, as rolling the dough into a very thin sheet and drying it in that condition.

In some cases, for example in connection with gelatin, it may be desirable or necessary to perform some auxiliary procedural steps in order to so change the properties of the dough that it can be readily formed into small particles for drying, as where the partially spray-dried material would result in a product which was a somewhat sticky dough.

There are at least two methods of solving such a difficulty, the first being to lower the temperature of the sticky dough sufficiently so that it loses its sticky properties either due to freezing or by reason of gel-formation of the colloidal material or other changes in attributes. This rather hard, reduced-temperature, tough dough can then be broken up into small particles by any conventional means as in a hammer-mill, a sharp-edged cutting device, or by other numerous processes, and the resulting fine particles can then be dried in the continuous belt-drier.

The other method involves the addition to such sticky dough in the mixer, or any second mixer, of a sufficient amount of material previously dried in the spray-drier and continuous belt-drier to absorb the excess moisture and eliminate the sticky condition of the dough, which may then be easily subdivided into fine-particle size or into thin sheets for drying. The reason for partially spray-drying the material is to be able to thoroughly compress such material to the desired density, a possible example of such second procedure being in the case of the use of pectin.

Those acquainted with this art will readily understand that the invention, as defined hereinafter, is not necessarily limited to the precise and exact details of structure and procedure set forth, and that these may be modified within reasonable limits as occasion indicates without loss of the advantages and benefits accruing from the use of the invention.

I claim:

1. The method of partially drying in a spray-drier a liquid containing less than 25% thickening solids to provide a product with sufficient liquid content to permit it to be mixed into dough condition, so mixing such dough, then forming the dough for efficient drying, and drying the formed dough.

2. The method of partially drying in a spray-drier a liquid containing less than 25% thickening solids to provide a product with sufficient liquid content to permit it to be mixed into dough condition, so mixing such product into dough condition then subdividing such dough into small particles, and drying said particles.

3. The method of partially drying in a spray-drier a liquid containing less than 25% thickening solids to provide a product with sufficient liquid content to permit it to be mixed into dough condition, so mixing such dough, then extruding the dough into small particles, and drying said particles.

4. The method set forth in claim 1, in which said liquid is Irish moss extract-solution.

5. The method set forth in claim 2, in which said liquid is Irish moss extract-solution.

6. The method set forth in claim 3, in which said liquid is Irish moss extract-solution.

7. The method of partially drying in a spray-drier a liquid containing less than 25% thickening solids to provide a partially dried product, wetting such product and making a dough thereof, then forming such dough for efficient drying, and drying the formed dough.

8. The method of partially drying an Irish moss extract-solution in a spray-drier to provide a partially dried product, wetting such product and making a dough thereof, then forming such dough for efficient drying, and drying the formed dough.

9. The method set forth in claim 8, in which the wetting agent is Irish moss extract-solution.

10. The method of partially drying in a spray-drier a liquid containing less than 25% thickening solids, converting the product from such partial drying into a dough, then forming such dough for efficient drying, and drying the formed dough.

11. The method of partially drying in a spray-drier a liquid containing less than 25% thickening solids to provide a product with sufficient liquid content to permit it to be mixed into sticky dough consistency, so mixing such dough, reducing the temperature of such sticky dough to overcome its sticky characteristics, forming such reduced-temperature dough for efficient drying, and drying the formed dough.

12. The method of partially drying in a spray-drier a liquid containing less than 25% thickening solids to provide a product with sufficient liquid content to permit it to be mixed into sticky dough consistency, so mixing such dough, adding to such sticky dough sufficient of a spray-dried product of the same liquid to overcome its sticky properties, then forming such treated dough for efficient drying, and drying the formed dough.

ARTHUR E. SIEHRS.

REFERENCES CITED

The following references are of record in the file of this patent:

UNITED STATES PATENTS

| Number | Name | Date |
| --- | --- | --- |
| 1,063,581 | Nicolai | June 3, 1913 |
| 1,278,297 | Bradden | Sept. 10, 1918 |
| 1,157,935 | Gray | Oct. 26, 1915 |
| 1,235,716 | Mooney | Aug. 7, 1917 |
| 1,239,766 | Brownell | Sept. 11, 1917 |
| 1,240,816 | Brownell | Sept. 25, 1917 |
| 1,250,427 | Cambell | Dec. 18, 1917 |
| 1,668,446 | Anderson | May 1, 1928 |
| 1,726,511 | Henry | Aug. 27, 1929 |
| 1,735,356 | Bradden | Nov. 12, 1929 |
| 1,814,986 | Walsh | July 14, 1931 |
| 2,108,582 | Dunham | Feb. 15, 1938 |
| 2,143,413 | Ellis | Jan. 10, 1939 |
| 2,192,041 | Headland | Feb. 27, 1940 |
| 2,358,827 | Rakowsky | Sept. 26, 1944 |